Jan. 19, 1960     R. T. CARRICO     2,921,344
METHOD OF MAKING SOLID TIRE WHEELS
Filed April 16, 1958
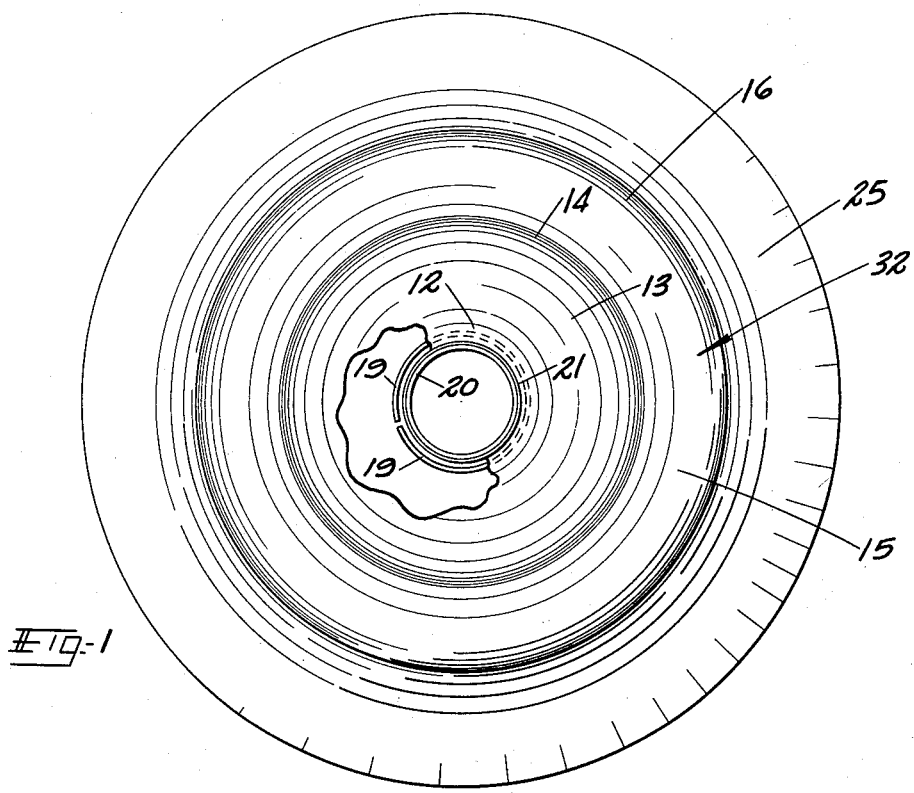
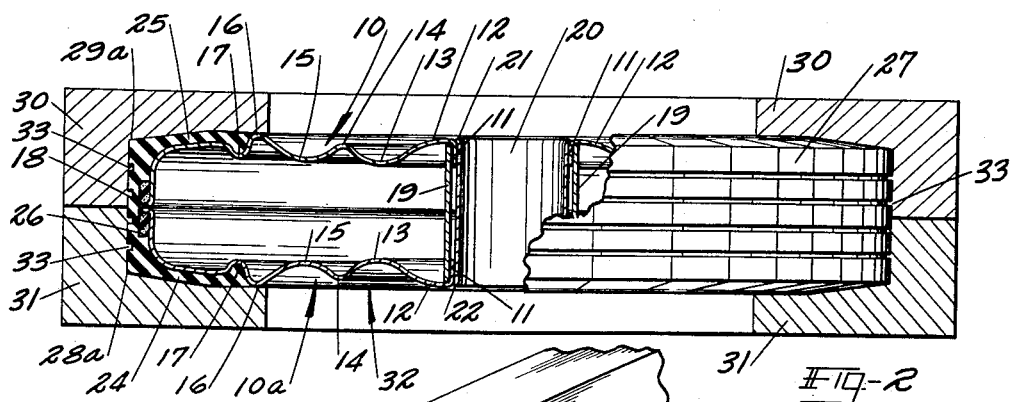
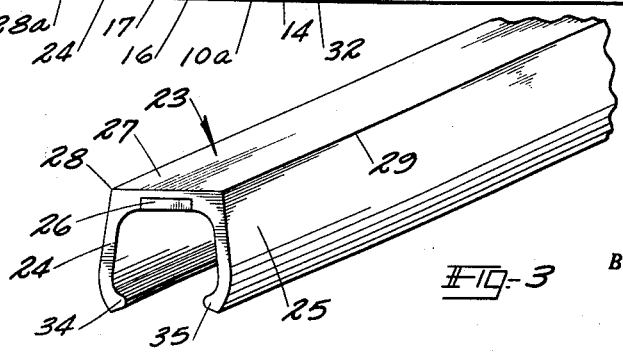
INVENTOR.
RALPH T. CARRICO
BY Herbert Q. McIntury
ATTORNEY

United States Patent Office 2,921,344
Patented Jan. 19, 1960

2,921,344
METHOD OF MAKING SOLID TIRE WHEELS

Ralph T. Carrico, Indianapolis, Ind., assignor to Indus Corporation, Indianapolis, Ind., a corporation of Indiana Application April 16, 1958, Serial No. 728,978

8 Claims. (Cl. 18—47.5)

This invention relates to a metal wheel around which is formed a solid rubber tire. The invention finds many uses, particularly in the use of such wheels on lawn mowers, carts, baby carriages, and the like, and in fact in any use where a relatively small diameter wheel is employed and is required to have a tire resilient to some extent, all in the absence of having to carry air therein under pressure above atmospheric.

The present invention resides in the particular method of making the wheel and forming the tire therearound and also in the finished wheel.

One particular advantage of the present invention resides in the fact that the wheel proper being made out of metal such as a drawing steel is made to have diaphragm sides formed by concentric spaced apart ribs in the side walls so that when the tire is to be formed in place around the periphery of the wheel, the wheel and unvulcanized rubber may be placed in a mold and under the heating operation employed to initiate vulcanization of the rubber, the wheel, by reason of a diaphragm construction will expand to exert pressure on the rubber which lies between the peripheral portion of the wheel and the inner face of the mold so that not only is heat applied, first to initiate vulcanization of the rubber, but also simultaneously the heat expands the wheel to set up desirable pressure to cause the rubber to flow into all of the corners and configurations provided in the mold for the finished design of the tire itself.

A great advantage of the invention resides in the fact that a considerable reduction in cost of making the wheel is found as compared to methods heretofore known.

One particular form of the invention is illustrated in the accompanying drawing, in which Fig. 1 is a view in side elevation of a completed wheel;

Fig. 2 is a diametrical section through a mold containing a completed wheel shown in partial section; and Fig. 3 is a fragmentary length of a strip of extruded vulcanizing rubber for tire formation.

A pair of identically shaped and dimensioned wheel sides 10 and 10a are formed. Each side 10 and 10a constitutes one half of the wheel in the absence of a tire and of a central bore to receive bearings. The side wall 10 is produced to have a hub flange 11, from which flange 11, the metal is formed to extend through a portion 12 curving inwardly and thence outwardly to form an inwardly entering rib 13 substantially tangential to the plane extending normally from the inner end of the flange 11. From the rib 13, the metal is carried outwardly and thence more sharply around and back to the plane as indicated, forming an outwardly extending rib 14 of sharper contour than is the inwardly extending contour of the rib 13.

From the outermost extension of the rib 14, the metal is curved inwardly again much in the nature of the rib 13, forming an elongated rib 15 directed inwardly of the side and terminating again in the plane to which the rib 13 is tangent and in which is the inner edge of the flange 11.

From the rib 15, the metal again is formed to curve around outwardly to another outwardly extending rib 16, this rib 16 extending outwardly from the plane as mentioned a slightly greater distance than does the rib 14. From the rib 16, the metal is carried inwardly to provide a bead 17 entirely around the wheel side 10 and from the inwardly extending bead 17, the metal is brought outwardly and then carried around in a more or less L shape to terminate in an annularly outwardly extending short flange 18. The other wheel side 10a, as above indicated, has the identical shape as does the wheel side 10 just described. These two wheel sides 10 and 10a are brought together to have their flanges 18 abut one another and are welded one to the other to form an integral wheel from the two sides.

A metallic sleeve 19 is inserted between the two sides 10 and 10a to surround the flanges 11 of the two sides, and be held thereagainst in order to keep the hub portion of the two sides spread apart the proper distance. Then there is a hub sleeve 20 inserted through the openings defined by the flanges 11, this sleeve 20 being of that diameter which will have a sliding fit against the faces of the two flanges 11, and has a sufficient length to permit it to be peened or rolled over at the ends as at 21 and 22 so as to retain the flanges 11 against the inner piece 19 and also to prevent spreading apart of the flanges axially of the member 19 and sleeve 20. A rigid, hollow metallic wheel is thus formed, and it is to be noted that by reason of the ribs inwardly and outwardly extending in the wheel sides 10 and 10a, the wheel may expand laterally by reason of this diaphragm construction.

A strip of extruded vulcanizable rubber generally indicated by the numeral 23 has an inner contour conforming to the external contour of the peripheral portion of the wheel made up of the two sides 10 and 10a, and has sides 24 and 25 which will extend around the sides of these two wheel sides 10 and 10a and engage within the beads 17 respectively on the sides of the wheel portions.

Preferably the extrusion 23 carries a center core 26 of a rubber composition which foams upon heating and becomes spongy of a thickness less than the overall thickness of the body portion 27 of the strip 23. It is to be noted that in the form herein shown, the strip 23 is formed to have upper sharp corners 28 and 29, so shaped as to fit initially into the like corners 29a and 28a of the two respective halves 30 and 31 of a mold. This particular design of course may be changed as may be desired.

In applying the vulcanizable rubber to the wheel generally designated by the number 32, a length of the extruded strip 23 is cut to have substantially the exact peripheral length of the wheel 32, at least so that the ends of the strip so cut will come together into abutment. That is, the cut length is positioned around the periphery of the wheel 32 to have the body portion 27 come against the peripheral portion of the wheel, and be centered laterally on the short, welded together, flanges 18 with the leg portions 24 and 25 straddling the periphery and extending down to the ribs 16. The wheel thus fitted with the vulcanizable rubber is placed in a mold section such as section 31, and the other section 30 is brought down over the upper half of the wheel, and these two mold sections 30 and 31 are secured tightly together. The two mold sections have beads 33 formed therearound so as to provide grooves in the tread of the finished tire all as is well known practice. The thicknesses of the legs 24 and 25, and of the body 27, are such that they will substantially fill the cavity of the mold. While not herein shown, the mold sections 30 and 31 will of course have means for centering the wheel 32 within the mold cavity.

The mold is closed upon the wheel and rubber assembly, and in this closing action pressure is exerted laterally on the wheel tending to squeeze the side walls one toward the other. Heat is applied to the closed mold and under the combined action of the wall pressure and the heat, the rubber will flow into intimate contact into all the contours of the mold faces and against the wheel surfaces, completely filling the cavity therebetween.

Under this rubber flow the initial wall pressure against the rubber dissipates and the walls relax substantially to their original states prior to the mold clamping pressure. That is, this return travel of the wall in its bellows action, forces the rubber into said intimate contact for sharp molding.

The heating temperature and period of application may vary, such, for example, between various rubber compounds. It will range around 325 degrees, and will be maintained from five to thirty minutes to complete vulcanization.

More explicitly, during the heating operation, the mold is brought up to the required temperature, and simultaneously, the rubber softens and flows, the wheel sides 10 and 10a are pressing outwardly. By reason of their bellows construction, they will readily expand laterally carrying the legs 24 and 25 of the rubber compressibly against the mold face, and in turn compressibly against the peripheral side portions of those wheel sides so that the beads 17 will be compressibly filled with the rubber. It is to be noted, Fig. 3, that initial beads 34 and 35 are formed on the opposing sides of the legs 24 and 25 in the extrusion 23. Also with the return expansion laterally of the wheel sides 10 and 10a, there is a slight expansion diametrically of the combined wheel sides 10 and 10a, and this diametrical or radial expansion effect is augmented by reason of the presence of the foaming rubber 26 carried by the extrusion 23. That is to say, the radial expansion of the wheel sides 10 and 10a, in addition to the primary lateral pressure, will exert a slightly increased pressure on the body 27 of the rubber, and that pressure is augmented by the expansion of gases of the heated sponge rubber core 26.

These combined pressure effects serve highly effectively in causing the rubber 23 to flow into the sharp corners 28a and 29a of the mold, and also in intimate contact around the beads 33. Any surplus of rubber may extrude itself from within the mold cavity over the ribs 17, emerging as a fin which may be readily trimmed after the wheel is removed from the mold. It is not necessary in this process that the rubber be vulcanized into intimate bonding action with the periphery of the wheel, since there is sufficient gripping of that peripheral portion by the said walls presenting the beads 34 and 35 fitting snugly into the wall side beads 17. This construction gives what might be termed a clinching action, particularly in respect to tendency of travel of the side walls radially of the wheel 32.

It will be noted that the bellows expanding action is set up due to the complete enclosure of the peripheral portion of the wheel 32, and due to the fact that the hub portions of the sides 10 and 10a are secured against inward contraction and outward expansion by reason of the presence of the two elements 19 and 20. Of course after the mold has cooled and the tire and wheel assembly has been removed therefrom, the side walls 10 and 10a have contracted to their originally formed dimensions. The wheel 32 is then ready to receive any assembly of bearings within the sleeve 20 as may be desired.

While reference above has been made to employment of the rubber in a preformed strip, the rubber may be cold flowed from a mass directly into the mold cavity, and in such practice, the bellows action of the wheel side walls becomes of even greater importance to carry the injected rubber into the required uniform spread contact with the mold and wheel surfaces.

The term "rubber" herein employed is intended to constitute a generic term inclusive of natural rubber, reworked used rubber and synthetic rubber, including plastics of a resilient nature to some degree.

While I have herein shown and described my invention in the one particular form and method of making it, I do not desire to be limited to that precise form beyond the limits which may be imposed by the following claims.

I claim:

1. The method of forming a rubber tired wheel which comprises forming two complementary wheel sides each with opposing concentric ribs, inturned peripheral portions, and inturned annular hub flanges; bringing together said sides to have said peripheral portions abut one another and to have said hub flanges held apart; securing together said sides through said abutting areas of said portions; inserting an annular ring between said sides and over said flanges, spacing apart said sides by ends of the ring abutting said sides; inserting a sleeve through said sides across said flanges; turning the ends of the sleeve over said sides around the juncture of said flanges with those sides limiting expansion of the sides from said ring, thereby forming a closed hollow wheel with opposing bellows-like walls; extruding a strip of generally U-shaped preformed vulcanizable rubber and cutting a length therefrom to equal substantially the circumferential length of said peripheral portions and placing said length about those portions; surrounding the rubber and wheel peripheral portions with a cavity mold under pressure against the wheel sides pressing them one toward the other; heating said mold to initiate flow of said rubber intimately into all parts and against all faces of the mold cavity; said wheel sides springing back against the flowing rubber and being relieved of said mold pressure; and then cooling the mold and wheel and removing the mold.

2. The method of claim 1 in which said strip has legs straddling and extending from the periphery of said wheel and there is added a rubber compound around said strip length between said legs emitting gas under heating to augment pressure on said strip length between said legs.

3. The method of forming a rubber tired wheel which comprises forming a hollow bodied metal wheel to have a closed peripheral portion between side walls and corrugations in said side walls forming concentric ribs, and initially having an open, annular hub portion through said walls; inserting a spacer between and abutting said walls from within and at said portion; placing a hub member through said hub portion; fixing the ends of said member to said walls restraining the walls against their spreading apart from bearing against said spacer; preforming a strip of vulcanizable rubber with a body and a leg extending from each side thereof to define a contour therebetween substantially matching that of said wheel peripheral portion; cutting a length of said strip to equal substantially the circumference of said peripheral portion and placing that length around the portion with ends in abutment and said legs straddling the peripheral portion to extend along opposite sides thereof; placing the wheel and rubber assembly in a mold with the rubber length fitting within a cavity around the mold and pressing the wheel side walls toward each other; and heating the mold to rubber vulcanization temperature, said wheel being free to expand laterally under said heating to add pressure forcing the rubber against the mold cavity walls.

4. The method of claim 3 in which a bead is formed around and entering each of said walls as a terminus to said peripheral portion to define an annular pocket therearound open to said mold cavity, forming an annular pocket receiving and retaining rubber flowing therein under said pressure through said legs, the pocket being rubber filled and any excess escaping over that margin of the bead located nearest said hub portion; cooling the mold and wheel after curing of the rubber; and severing rubber flash which may have flowed from said bead over the margin of the bead nearest said wheel hub portion.

5. The method of forming a rubber tired, metal wheel which comprises forming a hollow bodied metal wheel with opposed concentrically corrugated side walls joined one with the other around the wheel peripheral portion and fixing apart hub portions of the side walls; enclosing the peripheral portion of the wheel including outward portions of the side walls and pressing those wall portions one toward the other by a mold defining a tire forming cavity in the mold around said wheel peripheral portion; said mold holding a mass of rubber in and approximately filling the cavity; heating the mold to render the rubber flowable; said inwardly pressed walls bearing against said rubber within the cavity and carrying the flowing rubber into a reduced volume as the rubber comes into intimate contact with all the contours and configurations of the mold and wheel portions in the mold.

6. The method of claim 5 in which said rubber is preformed and wrapped around said wheel periphery prior to closing the mold about said wheel periphery.

7. The method of forming a rubber tired, metal wheel which comprises forming a hollow metal, annular generally U-shaped in section body with a closed peripheral portion, and with a central opening therethrough from which opening there extends inwardly of the body a pair of flanges one toward the other, and annular ribs being formed around the sides of the body intermediate said peripheral portion and said central opening; placing a sleeve inside of the body around said flanges limiting the inward travel one toward the other of said flanges; placing a second sleeve through said opening across said flanges defining a central bore through the body; peening the ends of the second sleeve over the outsides of the body from which said flanges extend holding said flanges from laterally spreading apart; and molding a rubber mass under heat around said peripheral portion; and maintaining said heat until said body expands laterally.

8. The method of claim 7 in which said mold is placed around said peripheral portion to form a tire cavity; said rubber mass is placed in said mold; said body through said ribs expands laterally primarily adjacent said peripheral portion; while said body is centrally held against lateral expansion by said second sleeve.

References Cited in the file of this patent

UNITED STATES PATENTS

| | | |
|---|---|---|
| 2,113,031 | Mertz | Apr. 5, 1938 |
| 2,354,446 | Brown | July 25, 1944 |
| 2,445,701 | Vogt | July 20, 1948 |
| 2,497,226 | McNeill | Feb. 14, 1950 |
| 2,629,420 | Walklet | Feb. 24, 1953 |
| 2,632,550 | Panter | Mar. 24, 1953 |
| 2,672,914 | Weigold | Mar. 23, 1954 |
| 2,692,801 | Rosenberg | Oct. 26, 1954 |

FOREIGN PATENTS

| | | |
|---|---|---|
| 268,640 | Italy | Oct. 24, 1929 |
| 77,734 | Sweden | July 11, 1933 |
| 867,302 | France | July 15, 1941 |